(12) United States Patent
Henriksson et al.

(10) Patent No.: US 8,838,863 B2
(45) Date of Patent: Sep. 16, 2014

(54) RESOURCE CONTROLLING WITH DYNAMIC PRIORITY ADJUSTMENT

(75) Inventors: Tomas Henriksson, Sollentuna (SE); Elisabeth Francisca Maria Steffens, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 12/919,864

(22) PCT Filed: Nov. 9, 2009

(86) PCT No.: PCT/IB2009/054961
§ 371 (c)(1),
(2), (4) Date: Nov. 17, 2010

(87) PCT Pub. No.: WO2010/052679
PCT Pub. Date: May 14, 2010

(65) Prior Publication Data
US 2011/0055444 A1 Mar. 3, 2011

(30) Foreign Application Priority Data
Nov. 10, 2008 (EP) ..................................... 08168737

(51) Int. Cl.
G06F 12/00 (2006.01)
G06F 13/14 (2006.01)
G06F 13/38 (2006.01)
G06F 13/16 (2006.01)

(52) U.S. Cl.
CPC .................................. *G06F 13/1615* (2013.01)
USPC ............................ 710/244; 710/240; 710/241

(58) Field of Classification Search
CPC . G06F 13/1615; G06F 13/364; G06F 13/362; G06F 13/1605; G06F 13/14; G06F 9/52; G06F 13/18; G06F 13/374; G06F 13/368; G06F 11/3664; G06F 13/36; G06F 9/5016
USPC ................................................... 710/240–244
See application file for complete search history.

(56) References Cited

U.S. PATENT DOCUMENTS 4,493,036 A * 1/1985 Boudreau et al. ............. 710/244
5,193,090 A * 3/1993 Filipiak et al. ................ 370/440
(Continued)

FOREIGN PATENT DOCUMENTS

| CN | 1495614 A | 5/2004 |
| CN | 1518691 A | 8/2004 |

(Continued)

OTHER PUBLICATIONS

Bianchini et al., "Can High Bandwidth and Latency Justify Large Cache Blocks in Scalable Multiprocessors?," Parallel Processing, 1994. vol. 1. ICPP 1994. International Conference on , vol. 1, pp. 258-262, Aug. 15-19, 1994.*

(Continued)

*Primary Examiner* — Faisal M Zaman
(74) *Attorney, Agent, or Firm* — Fenwick & West LLP (57) ABSTRACT

The present application relates to a method for resource controlling comprising controlling the processing of requests of a first category having a first priority. The method comprises controlling the processing of requests of a second category having a second priority, wherein the first priority is set such that processing the requests of the first category has priority over processing the requests of the second category. The method comprises blocking requests of the first category by a mechanism that detects when a predefined condition regarding the service provided to the second category is met.

17 Claims, 2 Drawing Sheets

(56) References Cited

U.S. PATENT DOCUMENTS

| | | | |
|---|---|---|---|
| 5,917,822 A * | 6/1999 | Lyles et al. | 370/395.4 |
| 6,105,094 A | 8/2000 | Lindeman | |
| 6,198,724 B1 * | 3/2001 | Lam et al. | 370/233 |
| 6,223,244 B1 | 4/2001 | Downer et al. | |
| 6,240,458 B1 | 5/2001 | Gilbertson | |
| 6,629,220 B1 | 9/2003 | Dyer | |
| 6,721,273 B1 * | 4/2004 | Lyon | 370/235 |
| 6,954,844 B2 * | 10/2005 | Lentz et al. | 712/29 |
| 7,062,582 B1 * | 6/2006 | Chowdhuri | 710/116 |
| 7,143,219 B1 * | 11/2006 | Chaudhari et al. | 710/111 |
| 7,203,621 B1 * | 4/2007 | Veitch et al. | 702/182 |
| 7,219,347 B1 * | 5/2007 | Waddington | 718/104 |
| 7,263,587 B1 * | 8/2007 | Yeh et al. | 711/158 |
| 7,577,780 B2 * | 8/2009 | Huang et al. | 710/116 |
| 7,668,177 B1 * | 2/2010 | Trapp et al. | 370/395.42 |
| 8,150,407 B2 * | 4/2012 | Ho et al. | 455/452.2 |
| 8,285,914 B1 * | 10/2012 | Venkatramani et al. | 711/5 |
| 8,307,139 B1 * | 11/2012 | Chowdhuri | 710/240 |
| 2002/0069310 A1 * | 6/2002 | Scandurra et al. | 710/240 |
| 2002/0178148 A1 * | 11/2002 | Sobel et al. | 707/3 |
| 2002/0199088 A1 | 12/2002 | Burns et al. | |
| 2003/0074507 A1 * | 4/2003 | Weber | 710/240 |
| 2003/0081624 A1 * | 5/2003 | Aggarwal et al. | 370/412 |
| 2003/0177296 A1 * | 9/2003 | Kurth | 710/244 |
| 2004/0030844 A1 | 2/2004 | Tojima et al. | |
| 2004/0059879 A1 * | 3/2004 | Rogers | 711/154 |
| 2005/0066138 A1 * | 3/2005 | Horn et al. | 711/158 |
| 2006/0149874 A1 * | 7/2006 | Ganasan et al. | 710/110 |
| 2006/0184746 A1 | 8/2006 | Guthrie et al. | |
| 2006/0262748 A1 * | 11/2006 | Dahl et al. | 370/329 |
| 2007/0008978 A1 * | 1/2007 | Pirzada et al. | 370/395.43 |
| 2007/0022238 A1 * | 1/2007 | Metsker | 710/113 |
| 2007/0101033 A1 * | 5/2007 | Chen et al. | 710/241 |
| 2008/0065801 A1 * | 3/2008 | Fukuyama et al. | 710/117 |
| 2008/0077720 A1 * | 3/2008 | Fanning | 710/240 |
| 2008/0091866 A1 * | 4/2008 | Cox et al. | 710/243 |
| 2010/0115167 A1 * | 5/2010 | Tardieux et al. | 710/240 |
| 2010/0278190 A1 * | 11/2010 | Yip et al. | 370/412 |

FOREIGN PATENT DOCUMENTS

| | | | | |
|---|---|---|---|---|
| CN | 101286946 A | | 10/2008 | |
| JP | 62026563 A | * | 2/1987 | G06F 13/16 |
| WO | WO 2008015496 A1 | * | 2/2008 | G06F 21/79 |

OTHER PUBLICATIONS

Hamad et al., "Induced Packet Loss Reduction by Max-Heap Overlay Construction Based on the Bandwidth-Latency Product Measures," Innovations in Information Technology, 2007. IIT '07. 4th International Conference on , pp. 626-630, Nov. 18-20, 2007.*

Pogel et al., "Passive client-based bandwidth and latency measurements in cellular networks," Computer Communications Workshops (INFOCOM Wkshps), 2012 IEEE Conference on , pp. 37-42, Mar. 25-30, 2012.*

Breitbart et al., "Efficiently monitoring bandwidth and latency in IP networks," INFOCOM 2001. Twentieth Annual Joint Conference of the IEEE Computer and Communications Societies. Proceedings. IEEE , vol. 2, pp. 933-942, 2001.*

PCT International Search Report and Written Opinion, PCT Application No. PCT/US2010/026988, Jun. 2, 2010, 12 pages.

PCT International Search Report and Written Opinion, PCT Application No. PCT/IB2009/054961, Feb. 5, 2010, 9 pages.

ISA/EPO, International Search Report dated Feb. 5, 2010 for PCT/IB2009/054961.

Chinese First Office Action, Chinese Application No. 200980153669.1, Jul. 3, 2013, 24 pages.

Chinese First Office Action, Chinese Application No. 201080019117.4, Nov. 19, 2013, 14 pages.

Chinese Second Office Action, Chinese Application No. 200980153669.1, Mar. 18, 2014, 26 pages.

European Examination Report, European Application No. 09759815.5, May 7, 2014, 5 pages.

* cited by examiner

RESOURCE CONTROLLING WITH DYNAMIC PRIORITY ADJUSTMENT

TECHNICAL FIELD

The present application relates to a method for resource controlling. More particularly, the present application relates to a method for resource controlling comprising controlling the processing of requests of a first category having a first priority and controlling the processing of requests of a second category having a second priority, wherein the first priority is set such that processing the requests of the first category has priority over processing the requests of the second category. The present application relates also to a resource controller, a system-on-chip comprising said resource controller, a consumer electronic device comprising said system-on-chip and a computer program comprising instructions operable to cause a processor to perform said method.

BACKGROUND OF THE INVENTION

Nowadays, consumer electronic devices, such as televisions, PCs, mobile phones and the like, comprise system-on-chip (SoC) multiprocessors. The benefits of SoCs are their high performance, large flexibility and low cost. Furthermore, both the impact of programmable hardware on the total silicon area and the power consumption in the consumer electronic device can be reduced by employing a SoC.

The basic problem of SoCs is the communication between the processing units on the SoC and one or more external resources, like external memories or similar units. More particularly, a resource must be shared between several processing units or agents implemented on the SoC. A common concern is that the resource utilization must be high. Thereby, the overhead of using the resource may depend on the sequence of requests.

One approach is to split the requests sent by the processing units into at least two categories and assign the highest priority to one of these categories. For instance, the requests can be split into low latency traffic requests on the one hand and constant bandwidth traffic requests on the other hand. Normally, the low latency traffic requests comprise the higher priority. To prevent the lower priority traffic requests from starvation, the low latency requests must be limited. According to prior art, the processing of low-latency requests are limited based on their own bandwidth usage.

SUMMARY OF THE INVENTION

It is one objective of the present application to provide a method which improves resource controlling. It is another objective to prevent unnecessarily long average latency for low latency requests. A further objective is to facilitate the determination of accurate traffic budget. Another objective is to ensure sufficient bandwidth for constant bandwidth requests. Another objective is to provide a method which is particular suitable for controlling data transfer between a SoC and fast memory devices.

These and other objectives are solved by a method for resource controlling comprising controlling the processing of requests of a first category having a first priority. The method comprises controlling the processing of requests of a second category having a second priority, wherein the first priority is set such that processing the requests of the first category has priority over processing the requests of the second category. The method comprises blocking requests of the first category by a mechanism that detects when a predefined condition regarding a service provided to the second category requests is met.

The present method can be generally used for controlling the data transfer between at least one processing unit or agent and a resource, like a memory. In particular, the method can be used for controlling the data transfer between a plurality of processing units or agents arranged on a system-on-chip and one or more external resources, such as memories, in particular fast external memories.

The requests or data transfer requests sent by the at least one processing unit are divided into at least two different categories. In general, different system parameters or user wishes can be taken into account for determining the at least two categories. For instance, the requests can be divided into at least two categories or types depending on the required bandwidth, a maximum allowable latency, data size, processing unit, which has generated the request, and the like. The division should be performed such that a high performance for resource controlling, like memory controlling, can be ensured.

In particular, the division can be performed such that requests of one of these categories may be more important or should be preferably processed compared to the requests of the other category. This category may have a higher priority, the first priority, than the other category. In other words, the requests of the first category having the higher priority are normally processed.

It is found according to the present application that processing the requests of the second category can be ensured in a sufficient manner while requests of the first category are pending, if a pending request of the second category is processed while a predefined condition is met regarding the service provided to the second category. Contrary to expectation it is found that the bandwidth required for processing requests of the second category can be protected by blocking the high priority requests while the predefined condition is met. For instance, the requests of the second category can be processed within a limited time after detecting that the predefined condition has been met. It shall be understood that the requests can be also processed immediately after detecting that the predefined condition has been met.

The present application provides for improved resource controlling, such as memory controlling. Unnecessarily high average latency of high priority requests is prevented while at the same time sufficient bandwidth can be ensured for requests having low priority.

According to a further embodiment of the present application, the requests of the first category are blocked for allowing at least one request of the second category to be processed the predefined condition regarding the service provided to the second category requests is met.

In addition, according to another embodiment, the predefined condition may be that a bandwidth-and-latency service guarantee is about to be violated.

The processing of the requests of the second category while requests of the first category are pending may be achieved by explicitly blocking requests from the first category. For instance, blocking the requests of the first category can be controlled by an accounting mechanism.

Furthermore, according to another embodiment, the imminent violation of the bandwidth-and-latency service guarantee can be detected by an up-down counter reaching a predefined threshold, wherein the up-down counter keeps track of the service which the requests of the second category have received. The up-down counter may be implemented within an accounting mechanism. The up-down counter can count up for second category request service cycles and down for non second category request service cycles, or vice versa. For instance, in the case of net accounting, a transfer cycle is a transfer cycle and in the case of gross accounting, it is a transfer or preparation cycle.

According to a further embodiment, the service for the requests of the second category can be defined in at least one of the terms gross cycles or net cycles.

For instance, the service cycles may include only the cycles when data is transferred on the interface. That is referred to as net accounting. Another option is to include the data transfer cycles as well as preparation cycles in the service cycles. That is referred to as gross accounting. For instance, cycles which have to elapse for meeting the predefined condition are net cycles or data transfer cycles.

According to another embodiment of the present application, the requests of the first category may be requests for low latency traffic. The low latency traffic may require an average low latency. However, it may not need any guarantee on the latency or on the bandwidth. It may be advantageous to assign the highest priority to this kind of traffic requests.

Furthermore, according to another embodiment, the requests of the second category may be requests for constant bandwidth traffic. The constant bandwidth traffic may require a guaranteed minimum bandwidth and a guaranteed maximum latency.

In another embodiment, the predefined threshold value can be set, the initial value of the up-down-counter can be set, and the increment value and the decrement value of the up-down-counter can be set.

In addition, it is found that detecting when the predefined condition is met, like a predefined threshold is reached by an up-down-counter, can be performed in an easy way, if an accounting mechanism is implemented.

In another embodiment, the accounting value may be changed by a first predefined change value if no request of the second category is processed. In other words, the accounting value is associated with the requests of the second category resulting in a direct protection of the requests of the second category, such as the constant bandwidth requests. The first predefined change value may represent a particular number of cycles. The accounting value can be changed by a first predefined change value in case at least one request of the second category is pending but not processed. It may be advantageous to change the accounting value periodically, like every clock cycle. In other words, the accounting value can be updated every clock cycle for ensuring an exact accounting mechanism and an accurate detection possibility. Updating the accounting value includes resetting the accounting value to the initial value if no request of the second category is pending.

According to a further embodiment of the present application, the first predefined change value may be an increment value or a decrement value. In other words, the accounting value can be incremented and/or decremented.

In another embodiment, the accounting value may be changed by a first predefined change value if no request of the second category is processed. In other words, the accounting value is associated with the requests of the second category resulting in a direct protection of the requests of the second category, such as the constant bandwidth requests. The accounting value can be changed by a first predefined change value in case at least one request of the second category is pending but not processed. It may be advantageous to change the accounting value periodically, like every clock cycle. In other words, the accounting value can be updated every clock cycle for ensuring an exact accounting mechanism and an accurate detection possibility. Updating the accounting value includes resetting the accounting value to the initial value if no request of the second category is pending.

According to another embodiment of the present application, the accounting value can be changed by a second predefined change value if a request of the second category is processed. The second predefined change value may be also an increment or decrement value. It may be advantageous, if the second predefined value is an opposite value, i.e. if the first change value is an increment value, the second change value is a decrement value and vice versa.

Furthermore, the accounting mechanism can be easily implemented by defining a threshold value. The threshold value may be the bound at which processing of a pending request of the second category is due. In other words, the predefined condition is met. More particularly, according to a further embodiment, the predefined threshold value can be set and it can be detected when the accounting value is changed by one of the changing value such that the predefined threshold value is reached. Then the requests of the first category can be blocked. For instance, when the accounting value has reached the threshold value the second category requests is boosted by blocking the first category requests. It shall be understood that some cycles may elapse after detecting that the threshold has been reached before the first category request are blocked for allowing to process remaining data of a first category first. The threshold value can be chosen depending on the initial accounting value. By way of example, the initial accounting value can be set smaller than the threshold value causing that the first change value is an increment value. Otherwise, the first change value is a decrement value. Since an exact calculation is provided due to the use of the transfer cycle as the relevant index, unnecessarily long average latency for low latency requests can be prevented as well as sufficient bandwidth for constant bandwidth requests can be ensured by using the method according to the present application.

Moreover, in another embodiment, the at least one request of the second category can be processed if no request of the first category is pending. If no other requests than the second category requests are pending, these requests can be processed while the predefined condition is not met. The available bandwidth and processing time can be used optimally.

It may be also possible that more than merely two categories can be defined. According to a further embodiment, processing of requests of a third category having a third priority can be controlled. The priority may be higher, smaller, or a value which is between the previously mentioned priorities. For instance, requests of a third category may be internal commands, like refresh commands. These requests can be handled similar to the above stated requests.

Another aspect of the present application is a resource controller comprising a first buffer configured to store requests of a first predefined category comprising a first priority. The resource controller comprises at least a second buffer configured to store requests of a second predefined category comprising a second priority, wherein the first priority is set such that processing the requests of the first category has priority. The resource controller comprises a mechanism configured to block the requests of the first category when a predefined condition is met.

The resource controller comprises a mechanism configured to block the requests of the first category at the entrance of the buffer when a predefined condition regarding the second category is met.

For instance, the resource controller may be a memory controller or any other kind of controller for managing data transfer between a plurality of clients and at least one shared resource.

According to a further embodiment of the present application, at least one buffer may be formed as a FIFO buffer. The low latency traffic requests and/or the constant bandwidth traffic requests can be treated in separate queues. It shall be understood that according to other variants of the present application, all implemented buffers can be formed as FIFO buffers.

It may be possible that the buffer units are connected to the processing units via different interfaces. More particularly, the requests of the different categories may arrive on different interfaces. In case merely one interface is provided, the resource controller may comprise a detector. For detecting the category of the received requests and for putting the requests into the respective buffer a detector can be arranged for detecting the category of a received request. A simple possibility is given for sorting the different requests sent by one or more processing units or agents.

Furthermore, the resource controller according another embodiment of the present application may comprise at least one output terminal connected to at least one shared resource, like an external memory. The output terminal or memory interface may provide a constant or variable bandwidth. It shall be understood that two or more terminals can be provided as well as two or more shared resource, such as external memories can be provided.

According to a further embodiment, the mechanism may comprise at least one blocking switch configured to block the requests of the first category. The blocking switch can be either closed, i.e. first category requests can be processed, or it can be opened, i.e. the first category requests are blocked and the second category requests can be processed.

In addition, according to another embodiment, the resource controller may further comprise a comparator configured to detect whether a predefined threshold is reached by the accounting mechanism. The comparator can be located adjacent to the up-down-counter or in a blocking switch.

In a further embodiment, the resource controller may comprise an observer unit that detects if service is given to requests of the second category.

Furthermore, according to another embodiment, the observer unit may be configured to consider at least one of transfer and preparation cycles as service for the requests of the second category or solely transfer cycles as service for the requests of the second category.

A further aspect of the present application is a system-on-chip comprising at least one above mentioned resource controller and at least one processing unit. It shall be understood that the system-on-chip may comprise one or more processing units, such as digital signal processors, central processing units, accelerators, intellectual property cores and the like.

Furthermore, the system-on-chip may comprise or be connectable to at least one shared resource, like an external memory via the resource controller, like a memory controller. It shall be understood that, according to further variants of the present application, the system-on-chip may comprise further components, like a memory access network, a control network and the like.

A further aspect of the present application is a consumer electronic device comprising the above mentioned system-on-chip. For instance, the consumer electronic device may be a television device, a PC, a mobile phone or the like.

Another aspect of the present application is a package comprising the above-described system on chip according and an off-chip memory.

Another aspect of the present application is a computer readable medium having a computer program stored thereon. The computer program comprises instructions operable to cause a processor to perform the above-mentioned method.

These and other aspects of the present patent application become apparent from and will be elucidated with reference to the following Figures. The features of the present application and of its exemplary embodiments as presented above are understood to be disclosed also in all possible combinations with each other.

BRIEF DESCRIPTION OF THE DRAWINGS

In the Figures show.

Like reference numerals in different Figures indicate like elements.

DETAILED DESCRIPTION OF THE DRAWINGS

In the following detailed description of the present application, exemplary embodiments of the present application will describe and point out an enhanced resource controller and method for resource controlling which is particular suitable for use with fast external resource, such as fast external memories and which prevent unnecessary long average latency for a first category of requests, and at the same time, ensure sufficient bandwidth for requests of a second category.

In the following detailed description, for a better demonstration, the present application is elucidated by the aid of a memory controller taken merely the data transfer cycles into account. It shall be understood that any resource controller is comprised by the present application as well as gross cycles can be taken into account. It shall also be understood that gross cycles can be taken into account instead of merely the data transfer cycles.

Figure 1:
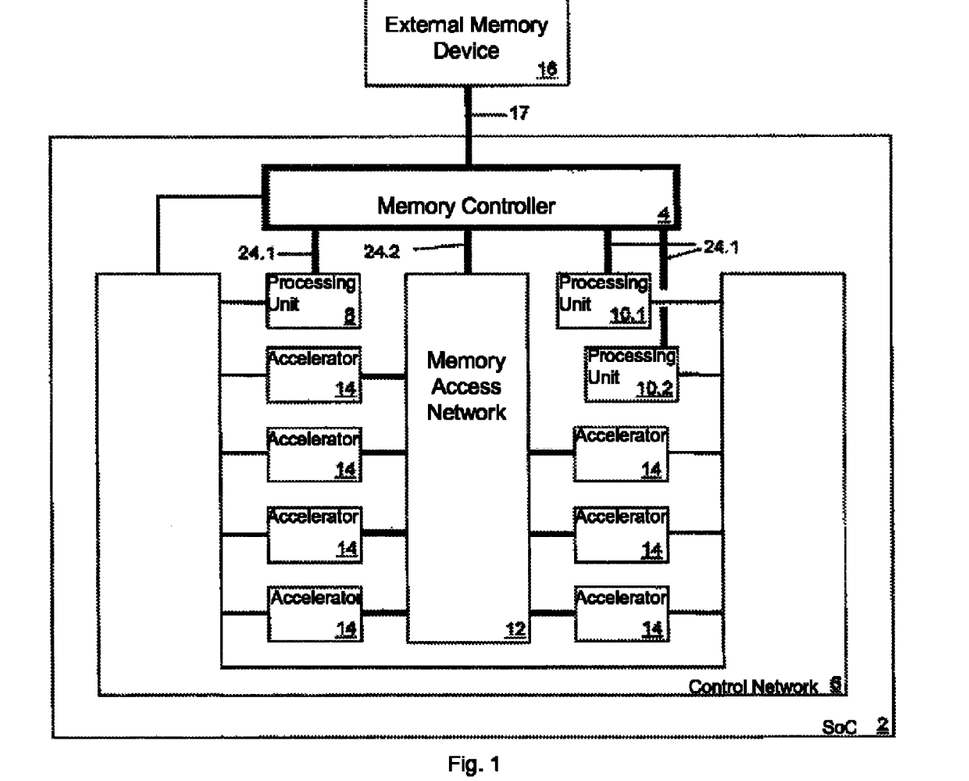
FIG. 1 an embodiment of the system-on-chip according to the present application,
FIG. 2 an embodiment of the resource controller according to the present application,
FIG. 3 a first flowchart of an embodiment of the method for resource controlling according to the present application,
FIG. 4 a second flowchart of an embodiment of the method for resource controlling according to the present application,
FIG. 5 a third flowchart of an embodiment of the method for resource controlling according to the present application.

FIG. 1 shows schematically an embodiment of the system-on-chip (SoC) according to the present application. As can be seen from FIG. 1, the shown SoC 2 is connected to an external memory 16. By way of example, a SDRAM can be employed as an external memory chip 16. In particular, fast memory devices can be used, such as a DDR2-1066 or a DDR3-1600.

The SoC 2 of the present embodiment can communicate with the external memory device 16 using a suitable memory controller 4 via a suitable output terminal 17. For instance, the output terminal 17 may be an interface device providing a high bandwidth. Besides the memory controller 4, the SoC 2 comprises a plurality of processing units 8, 10.1, 10.2 and 14. In the present embodiment, the SoC 2 comprises a first and a second digital signal processor (DSP) 10.1 and 10.2, a central processing unit (CPU) 8 and multiple accelerators 14, like intellectual property (IP) cores or the like.

All these processing units 8, 10.1, 10.2 and 14 are in communication with a control network 6. Furthermore, the accelerators 14 are connected to a memory access network 12, which is in turn connected to the memory controller 4. Additionally, the CPU 8 and the DSPs 10.1 and 10.2 are in communication with both the control network 6 and the memory controller 4.

Moreover, the processing units 8, 10.1, 10.2 are connected to the memory controller 4 via terminals 24.1 while the memory access network 12 is connected to the memory controller 4 via terminal 24.2.

It shall be understood that, according to other variants, the SoC 2 may comprise further, less and other components as well as it may be possible that two or more external memories are provided.

The memory controller 4 is configured to control the data transfer between the at least one external memory 16 and the processing units or agents 8, 10.1, 10.2 and 14 of the SoC 2. More particularly, the memory controller 4 may arbitrate between the requests from different agents.

Figure 2:
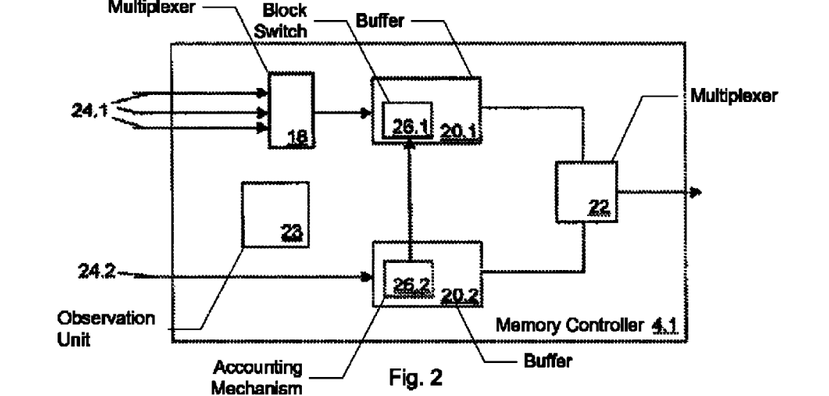

A more detailed representation of an embodiment of the memory controller 4.1 according to the present application is shown in FIG. 2. Requests for data transfer being sent by different processing units are received by the memory controller 4.1 via terminals 24.1. In case merely one terminal to the memory controller 4.1 is provided, a detector (not shown) can be arranged. The detector may be configured to detect the category of the received requests.

By way of example, the different requests can be divided into at least two different categories depending on predefined parameters, such as bandwidth requirements, latency requirements, data size and the like. In the present embodiment, the requests are divided into a first category representing low latency traffic requests and into a second category representing constant bandwidth traffic requests. Requests of the different categories arrive at different terminals, 24.1 and 24.2.

Requests from processing units that require low average latency belong to the low latency category. Requests from other processing units belong to the constant bandwidth category. The constant bandwidth traffic requires a guaranteed minimum bandwidth after an initial latency from the arrival of the first request of the constant bandwidth category after an idle period of the constant bandwidth traffic.

For instance, the low latency traffic can be defined depending on an average low latency, which should be met. Thereby, it is not needed to guarantee a particular latency or bandwidth. The constant bandwidth traffic requires a guaranteed minimum bandwidth and a guaranteed maximum latency per request.

In the shown embodiment, four terminals 24.1 and 24.2 are provided, wherein the terminals 24.1 may be provided to transmit the requests of a first category, while the requests of the second category can be transmitted via terminal 24.2. Furthermore, a multiplexer 18 is arranged for handling the three input terminals 24.1. The arbitration algorithm associated with multiplexer 18 is outside the scope of this invention.

It may be possible to use FIFO buffers for storing and pre-processing the requests of the respective category. Pre-processing can include conversion of the requests on the terminals 24.1 and 24.2 to internal memory controller requests. Pre-processing can further include command generation of preparation commands for the SDRAM. The internal organization of the buffers is not part of the invention.

While the buffer 20.2 may comprise an accounting mechanism 26.2, the buffer 20.1 may comprise a blocking switch 26.1. More particularly, the blocking switch 26.1 being configured to block processing of the requests of the first category can be controlled by the accounting mechanism 26.2. A more detailed elucidation will follow subsequently.

Furthermore, the memory controller 4.1 comprises a multiplexer 22 configured to select the request to be processed. More particularly, multiplexer may select a request from buffer 20.1 if there is any. Otherwise it may select a request from buffer 20.2. The selection can be done in compliance with the timing specification of interface 17. Dependent on the timing specification for interface 17 and the recently serviced requests, there are some clock cycles in which no request can be processed although there are requests pending. Those are the cycles that we refer to as preparation cycles.

Furthermore, the memory controller 4.1 may comprise an observation unit 23, which detects what type of request is processed. By way of example, the observation unit 23 may observe the multiplexer 22 and the requests which the multiplexer selects. In this particular example, the observation unit signals to the accounting mechanism whether the current cycle is provided to a request of the second category or not. The observation unit can operate in one of two modes, dictating how the preparation cycles are assigned. In the first mode, preparation cycles are allocated to the second category (the gross mode), in the second mode (the net mode), preparation cycles are not assigned at all. The observation unit can also be dynamically configured in one of its modes. Depending on the observation result, the up-down-counter 26.2 can be incremented or decremented. A detailed elucidation of the method for memory controlling follows subsequently.

It shall be understood that, according to further variants of the present application, more than merely two different request categories can be defined, like a third category representing internal refresh commands. In addition, it may be possible that three or more buffers are provided.

Figure 3:
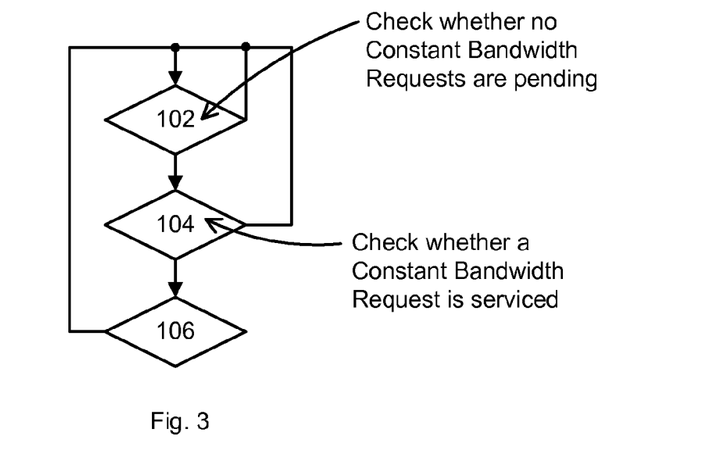

FIG. 3 shows a first simplified flowchart of an embodiment of the method according to the present application. Before elucidating FIG. 3 in detail, it is mentioned that the predefined values can be set at any time. In more detail, the clip value clip_cb as well as the threshold value boost_cb can be set to respective predefined values, wherein the clip value clip_cb is the maximum value of the accounting value account_cb and the threshold value boost_cb indicates the value at or below which the requests of the first category should be blocked. The value is defined such that some clock cycles, which can be taken after blocking first-category requests until the requests of the second category can be serviced, are taken into account. As mentioned above, the clip value clip_cb can be also set to the lowest value and the threshold value boost_cb can indicate the value at or above which the requests of the first category should be blocked. Furthermore, the constant bandwidth account value account_cb is set to the clip value clip_cb, which can be also called initial accounting value. Moreover, according to the present embodiment the first change value, i.e. the decrement value num_cb, and the second change value, i.e. the increment value inc_cb=den_cb−num_cb can be programmed.

In general, the previously mentioned values can be defined according to system-on-chip requirements, user wishes or the like. In the following, exemplified values and their derivation are pointed out. The bandwidth, which is given to the constant bandwidth transfer, is $$\frac{num\_cb}{den\_cb} * gabw, \tag{a}$$

wherein the parameter gabw represents the gross available bandwidth of the employed memory interface. Then the ratio of the constant bandwidth traffic of the employed memory can be determined. By way of example, the respective ratio may be 75%. Therefore, it may be advantageous to set the decrement value num_cb to 75 and the value den_cb can be set to 100 resulting in the increment value inc_cb=den_cb−num_cb=25. In general, the predefined values can be adapted according to the behavior of the resource, like the external memory.

The guaranteed latency may be clip_cb/num_cb. To achieve this, boost should be set such that under all circumstances, the account-value does not saturate at 0.

If the threshold value boost_cb is set properly, the maximum latency guaranteed is clip_cb/num_cb clock cycles. For example, the clip value clip_cb can be set to 1500. Then the maximum latency of the constant bandwidth stream is 200 clock cycles.

After explaining the specifying of the initial values, it is referred back to FIG. 3. Every clock cycle, the accounting value can be processed in the following way. In a first step 102, it can be checked whether no constant bandwidth requests are pending. In the case no constant bandwidth requests are pending, the accounting value can be reset to the clip value clip_cb and in the next clock cycle it can be started once again with step 102. Otherwise, it is checked in step 104 whether a constant bandwidth request is serviced, i.e. data is transferred in case of net accounting or in case of gross accounting, data is transferred or prepared. In this case, the accounting value can be incremented by inc_cb. Then it can be continued with step 102 in the next clock cycle.

If a constant bandwidth request is not serviced and a constant bandwidth request is pending, the accounting value is decremented by den_cb. Then it can be continued with step 102 in the next clock cycle.

It shall be understood that the order of steps 102 to 106 may be also different. In particular, the steps can be performed in parallel.

Figure 4:
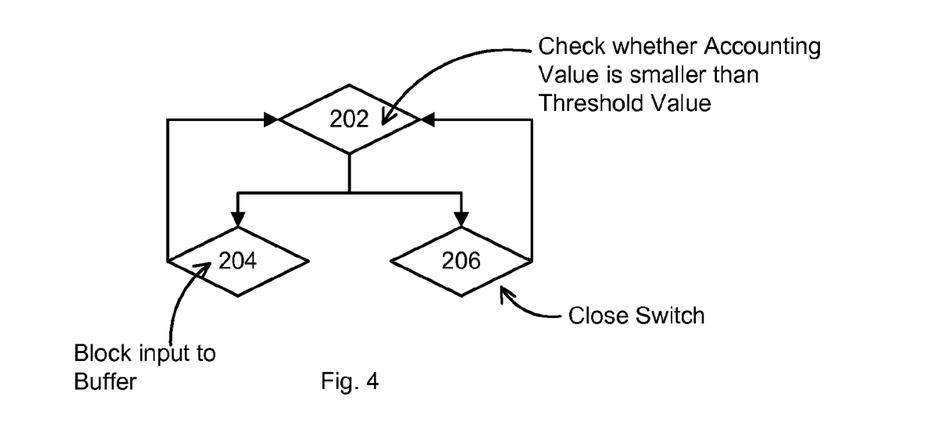

Referring to FIG. 4, a second simplified flowchart of an embodiment of the method according to the present application is depicted. In general, the requests having a higher priority, such as the low latency requests, are processed. At the same time as the previously mentioned method according to FIG. 3, every clock cycle it can be checked in step 202 whether the accounting value is smaller than the threshold value boost_cb. If it is detected that the accounting value is smaller than the threshold value boost_cb, for instance using a suitable comparator, the blocking switch 26.1 blocks the input to buffer 20.1 in step 204. In other words, the blocking switch 26.1 is opened. More particularly, if the constant bandwidth account value account_cb may fall below the threshold value boost_cb, the priority of the requests of the second category can be boosted. Whenever the constant bandwidth account value account_cb is smaller or equal to the threshold value boost_cb, the accounting mechanism 26.2 may block processing the low latency requested by activating (opening) the blocking switch 26.1. All low latency traffic request paths will be blocked, which after a certain delay will lead to constant bandwidth traffic requests being serviced in the presence of pending low latency traffic request paths.

Then, at the next clock cycle, it is checked once again whether the accounting value is smaller than the threshold value boost_cb. If this is not the case, the switch 26.1 is closed in step 206. Otherwise the switch 26.1 remains opened. Hence, the blocking switch is either opened or closed resulting in that either the first category requests or (after a certain delay) the second category requests can be processed.

Figure 5:
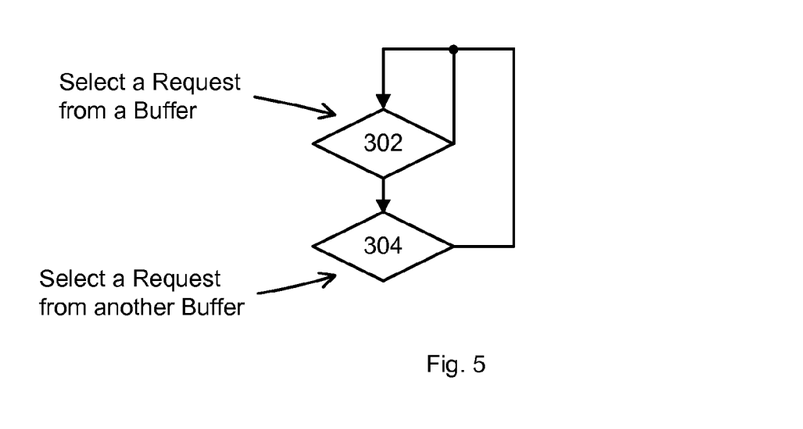

In FIG. 5, a third simplified flowchart of an embodiment of the method according to the present application is shown. In a first step 302 the multiplexer 22 selects a request from buffer 20.1 if there is any. Otherwise the multiplexer 22 selects a request from buffer 20.2 in step 304. The selection can be done in compliance with the timing specification of interface 17. Dependent on the timing specification for interface 17 and the recently serviced requests, there are some clock cycles in which no request can be serviced although there are requests pending. Those are the cycles that we refer to as preparation cycles.

It shall be understood that, according to other embodiments of the present application, it may be also possible to set an upper threshold value and increment the constant bandwidth account value in case no constant bandwidth traffic is serviced and check whether the constant bandwidth account value is equal or above the predefined threshold value.

Optionally a further threshold value limit_cb can be defined. For simplicity reasons this value is not taken into account in the embodiment, as shown in FIGS. 3 to 5. If the constant bandwidth account value account_cb is larger than the further threshold value limit_cb, the priority of the constant bandwidth port is lowered to background. The further threshold value limit_cb must be specified such that the equation $$\text{limit\_cb} \leq \text{clip\_cb} \tag{c}$$

is fulfilled, i.e. the maximum size of constant bandwidth transfer. The further threshold value limit_cb may protect against over-consumption by constant bandwidth transfer. If the constant bandwidth traffic is naturally bounded, the further threshold value limit_cb may be not needed.

According to the present application, it is possible to protect one constant bandwidth stream, or several independent constant bandwidth streams in an easy manner. Furthermore, it is possible according to the present application to use an accounting-based memory controller with emerging fast memory devices. For the programmer, it is facilitated to determine the constant bandwidth rate, since there is no need to include potential preparation cycles. Since the preparation time is excluded from constant bandwidth traffic accounting, the constant bandwidth rate is exact, i.e. no safety margin is needed in the rate, which leads to lower average latencies for low latency transactions.

Furthermore, it is readily clear for a person skilled in the art that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

The invention claimed is:
1. A method for resource controlling, comprising:
  receiving requests of a first category in a first buffer, requests of the first category including first data having a latency requirement;

receiving requests of a second category in a second buffer, requests of the second category including second data having a bandwidth requirement;

adjusting an accounting value of a counter in the second buffer based on (i) whether at least one request is pending in the second buffer for processing, (ii) a number of requests received after a time at which no request was pending in the second buffer and (iii) a number of requests in the second buffer that were processed after the time at which no request was pending in the second buffer;

assigning a first priority to the requests of the first category based on the latency requirement;

assigning a second priority to the requests of the second category based on the bandwidth requirement, the second priority having a lower priority than the first priority for processing;

determining that the bandwidth requirement is satisfied responsive to the accounting value reaching a threshold value; and generating, by the counter, a control signal to block the first buffer from receiving subsequent requests of the first category, responsive to determining that the bandwidth requirement is satisfied.

2. The method according to claim 1, wherein the latency requirement is an average latency.

3. The method according to claim 1, wherein the bandwidth requirement is defined by gross cycles or net cycles.

4. The method according to claim 1, further comprising:
setting the threshold value;
setting an initial value of the accounting value at the time when no request was pending in the second buffer for processing; and
setting a value to add to or decrease from the accounting value with each clock cycle until the accounting value is reset or reaches the threshold.

5. The method according to claim 1, further comprising receiving requests of a third category having a third priority lower than the second priority.

6. The method according to claim 1, wherein bandwidth requirement is a constant bandwidth.

7. The controller according to claim 6, wherein bandwidth allocated to a constant bandwidth request is a function of a decrement value of the counter.

8. The method according to claim 1, wherein the requests of the second category have a guaranteed latency, the guaranteed latency specified as the ratio of a maximum accounting value and a decrement value of the counter.

9. A controller, comprising:
a first buffer comprising a blocking switch configured to block requests of a first category from being received by the first buffer responsive to receiving a control signal, the first buffer configured to store requests of the first category including first data having a latency requirement;
a second buffer comprising;
an output coupled to an output of the controller and an output of the first buffer, the second buffer configured to store requests of a second category including second data having a bandwidth requirement, and
a counter configured to to adjust an accounting value based on (i) whether at least one request is pending in the second buffer for processing, (ii) a number of requests received after a time at which no request was pending in the second buffer and (iii) a number of requests in the second buffer that were processed after the time at which no request was pending in the second buffer, the counter further configured to generate a control signal to cause the blocking switch to block the first buffer from receiving subsequent requests of the first category responsive to determining that the bandwidth requirement is satisfied; and
a comparator configured to detect whether the counter reaches a threshold accounting value indicating that the bandwidth requirement is satisfied.

10. The controller according to claim 9, further comprising an observer unit that detects processing of the requests of the second category.

11. The controller according to claim 10, wherein the observer unit is configured to consider at least one of:
transfer and preparation cycles for processing the requests of the second category, and
solely transfer cycles for processing the requests of the second category.

12. The controller according to claim 9, wherein bandwidth requirement is a constant bandwidth.

13. The controller according to claim 9, wherein the latency requirement is an average latency.

14. The controller according to claim 9, further comprising:
a multiplexer having a first input coupled to the output of the blocking switch and a second input coupled to the output of the second buffer, the multiplexer configured to select from the stored requests of the first category and the stored requests of the second category for output of a selected stored request by the resource controller.

15. A system-on-chip, comprising:
a controller comprising:
a first buffer comprising a blocking switch configured to block requests of a first category from being received by the first buffer responsive to receiving a control signal, the first buffer configured to store requests of the first including first data having a latency requirement;
a second buffer comprising;
an output coupled to an output of the controller and an output of the first buffer, the second buffer configured to store requests of a second category including second data having a bandwidth requirement, and
a counter configured to adjust an accounting value based on (i) whether at least one request is pending in the second buffer for processing, (ii) a number of requests received after a time at which no request was pending in the second buffer and (iii) a number of requests in the second buffer that were processed after the time at which no request was pending in the second buffer, the counter further configured to generate a control signal to cause the blocking switch to block the first buffer from receiving subsequent requests of the first category responsive to determining that the bandwidth requirement is satisfied;
a comparator configured to detect whether the counter reaches a threshold accounting value indicating that the bandwidth requirement is satisfied; and
at least one processing unit coupled to the controller to process requests of the first or the second category from the controller.

16. The system-on-chip according to claim 15, wherein the controller further comprises a multiplexer having a first input coupled to the output of the blocking switch and a second input coupled to the output of the second buffer, the multiplexer configured to select from the stored requests of the first category and the stored requests of the second category for output of a selected stored request by the resource controller.

17. A non-transitory computer readable medium having a computer program stored thereon, the computer program comprising instructions operable to cause a processor to:
- receive requests of a first category in a first buffer, requests of the first category including first data having a latency requirement;
- receive requests of a second category in a second buffer, requests of the second category including second data having a bandwidth requirement;
- adjust an accounting value of a counter in the second buffer based on (i) whether at least one request is pending in the second buffer for processing, (ii) a number of requests received after a time at which no request was pending in the second buffer and (iii) a number of requests in the second buffer that were processed after the time at which no request was pending in the second buffer;
- assign a first priority to the requests of the first category based on the latency requirement;
- assign a second priority to the requests of the second category based on the bandwidth requirement, the second priority having a lower priority than the first priority for processing;
- determine that the bandwidth requirement is satisfied responsive to the accounting value reaching a threshold value; and
- generate, by the counter, a control signal to block the first buffer from receiving subsequent requests of the first category, responsive to determining that the bandwidth requirement is satisfied.

* * * * *